(12) United States Patent
Bennett et al.

(10) Patent No.: US 10,319,161 B2
(45) Date of Patent: Jun. 11, 2019

(54) SYSTEM AND METHOD FOR KEYLESS ACCESS CONTROL SYSTEM

(71) Applicant: UNIKEY TECHNOLOGIES INC., Orlando, FL (US)

(72) Inventors: Thomas Bennett, Winter Park, FL (US); Roy Luther Johnson, III, Windermere, FL (US)

(73) Assignee: UNIKEY TECHNOLOGIES, INC., Orlando, FL (US)

( * ) Notice: Subject to any disclaimer, the term of this patent is extended or adjusted under 35 U.S.C. 154(b) by 0 days.

(21) Appl. No.: 15/661,933

(22) Filed: Jul. 27, 2017

(65) Prior Publication Data

US 2019/0035183 A1 Jan. 31, 2019

(51) Int. Cl.
*G07C 9/00* (2006.01)
*G06K 19/07* (2006.01)
*G06K 7/10* (2006.01)
*G06F 3/044* (2006.01)

(52) U.S. Cl.
CPC ...... *G07C 9/00111* (2013.01); *G06K 7/10316* (2013.01); *G06K 19/0723* (2013.01); *G06F 3/044* (2013.01); *G07C 2009/00793* (2013.01)

(58) Field of Classification Search
CPC ............ G07C 9/00111; G06K 7/10316; G06K 19/0723
See application file for complete search history.

(56) References Cited

U.S. PATENT DOCUMENTS

| | | | |
|---|---|---|---|
| 2014/0176304 A1* | 6/2014 | Park | G07C 9/00309 340/5.61 |
| 2016/0042582 A1* | 2/2016 | Hyde | G07C 9/00944 70/53 |

* cited by examiner

*Primary Examiner* — Nabil H Syed
(74) *Attorney, Agent, or Firm* — Gard & Kaslow LLP

(57) ABSTRACT

A system and method for a keyless physical access control system, including keyless access to locks, is described. An access reader integrates a capacitive touch sensor and an RFID reader; the expected interference in operation of the capacitive touch sensor due to the excitation signal generated by the RFID antenna is avoided by selectively turning the RFID antenna on and off at periodic time intervals. The time intervals are selected to be long enough so that both the capacitive touch sensor and the RFID reader can operate normally during respective time intervals to unlock a lock, but short enough so that a user does not notice any delay in operation.

12 Claims, 4 Drawing Sheets

SYSTEM AND METHOD FOR KEYLESS ACCESS CONTROL SYSTEM

FIELD OF THE INVENTION

The present application relates generally to the control of physical access to locations, and more specifically to keyless access control systems.

BACKGROUND

Keyless access control systems are becoming more common. Rather than carrying keys, possibly many keys in the case of, for example, the various locks in an office building, such keyless systems allow a user to carry a single item or "credential," for example, a keycard, fob or other remote device (all referred to herein as "remote device"), that permits access to one or more locations. The user may more quickly gain access to an area without the need to find, insert and turn a traditional key in a lock if they carry a credential granting authorization to that area.

The credential carried by the user is characterized depending upon whether it contains a battery or does not contain a battery. A credential is considered to be "active" if it contains a battery, and "passive" if it does not contain a battery.

Prior art keyless locks generally operate in one of two ways. In a first type of keyless lock system, a "capacitive touch" system, a user carries an active credential that transmits a wireless signal, typically a Bluetooth signal, which is coded to indicate which location(s) the user should have access to, i.e., which locks may be unlocked. The user touches a lock which causes a change in measured capacitance, which in turn causes a sensor to search for a received Bluetooth signal from the active credential that indicates authorization to unlock the lock and allow the user to enter the location secured by the lock. If the Bluetooth signal from the user's active credential indicates such authorization, the lock is unlocked.

The range of such an active credential is preferably great enough that the user may keep the active credential in a pocket or purse while the user touches the lock. The active credential may be contained in a remote device that may, for example, be located on a keychain, or may be located within a mobile device such as a smartphone. One example of this type of keyless lock is the Kwikset Kevo from Spectrum Brands, Inc. of Middleton, Wis.

In some systems, the user need not actually touch a sensor to begin the access process, but rather a sensor may either detect the Bluetooth signal from the active credential based on the physically close presence of the active credential, for example, within about 12 inches of the sensor, or may even be able to detect a wave of the user's hand near the sensor. In the following discussion, references that the user touches a capacitive touch sensor to initiate the process are intended to include such systems that work based upon proximity as well.

In another type of keyless lock, commonly known as a radio-frequency identification ("RFID") system, the user carries a passive credential, which again may be a keycard, fob or other remote device (again all referred to as "remote device"), that typically contains an RFID chip that contains a passive tag with an authorization code that indicates which location(s) the user should have access to as well as, if desired, a card number. A card "reader" is mounted near the lock, and an antenna within the reader constantly generates an excitation signal.

When the RFID remote device is presented close enough to the reader, typically within about 5 centimeters of the reader, the excitation signal provides energy to the passive tag through inductive coupling, thus energizing the tag to wirelessly send its authorization code to the reader. The code is then passed to a controller, in some embodiments using the industry standard Wiegand communications protocol. If the authorization code is appropriate for the lock connected to the reader, the controller causes the lock to be unlocked.

Both capacitive touch systems and RFID systems are able to operate in a rapid fashion, so that the user does not experience a significant delay in opening a lock and gaining needed physical access when authorized. Detection of the Bluetooth signal, or the remote device code, is typically obtained in a fraction of a second, although the determination of whether the user is authorized to enter a location and unlocking of the lock may take a bit longer.

Until now it has not been thought possible to combine the two types of keyless locks to operate a single lock. RFID readers typically constantly generate an excitation signal at either 125 kilohertz (KHz) or 13.56 megahertz (MHz). When trying to integrate a capacitive touch sensor into an RFID reader, however, it has been found that the RFID excitation signal also energizes the capacitive touch sensor so that, when touched, the measured capacitance does not change enough to indicate that a user has touched the sensor. Thus, the capacitive touch sensor is essentially inoperable in this situation.

Accordingly, it would be desirable to have an improved keyless lock system that is capable of incorporating both a capacitive touch sensor with active credential, and an RFID sensor with passive credential.

SUMMARY OF THE INVENTION

As described herein, system and method for a keyless physical access control system, including keyless access to locks, is accomplished by integrating a capacitive touch sensor and an RFID reader; the expected interference in operation of the capacitive touch sensor due to the excitation signal generated by the RFID antenna is avoided by selectively turning the RFID antenna on and off at periodic time intervals.

According to some embodiments, a keyless access control device for controlling access to an area protected by a lock comprises: an RFID antenna configured to generate an excitation signal and receive a return signal from a nearby RFID chip; a wireless antenna; a capacitive touch sensor configured to determine when a user has touched the capacitive touch sensor; a wireless communications circuit configured to: use the wireless antenna to seek an active wireless signal from a nearby active wireless device when the capacitive touch sensor has been touched; and determine whether a received return RFID signal or a received wireless signal contains an authorization code; and a controller configured to: cause the wireless communications circuit to turn the RFID antenna on and off at regular time intervals; and determine whether a received authorization code permits access to the protected area, and, if so, unlock the lock.

According to other embodiments, a method of providing keyless access control to an area protected by a lock comprises: generating, from an RFID antenna, an excitation signal at regular time intervals; determining, by a wireless communication circuit, when the RFID antenna is generating an excitation signal, whether a return RFID signal has been received from a nearby RFID chip and whether the return RFID signal contains an authorization code; determining, by the wireless communication circuit, when the RFID antenna is not generating an excitation signal: whether a user has touched a capacitive touch sensor; if a user has touched the capacitive touch sensor, whether an active wireless signal has been received from a nearby active wireless device; and if an active wireless signal has been received, whether the active wireless signal contains an authorization code; and determining, by a controller, whether a received authorization code permits access to the protected area, and, if the received authorization code permits access, unlocking the lock.

DETAILED DESCRIPTION

A system and method for a keyless physical access control system, including keyless access to locks, combining a capacitive touch keyless access control system and an RFID keyless access control system is described.

The access readers of the described embodiments integrate a capacitive touch sensor and an RFID reader; the expected interference in operation of the capacitive touch sensor due to the excitation signal generated by the RFID antenna is avoided by selectively turning the RFID antenna on and off at periodic time intervals. The time intervals are selected to be long enough so that both the capacitive touch sensor and the RFID reader can operate normally during respective time intervals to unlock a lock, but short enough so that a user does not notice any delay in operation.

Figure 1:
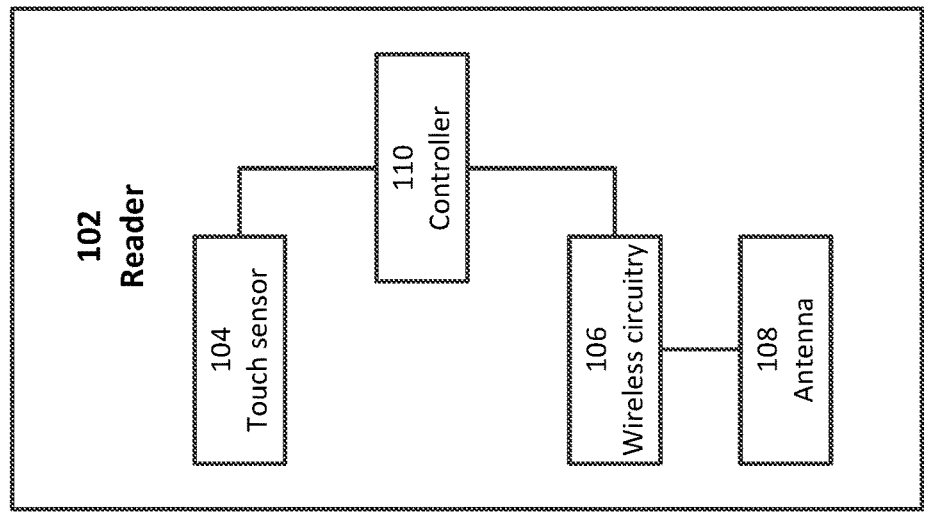
FIG. 1 is a block diagram of a capacitive touch keyless access control system according to the prior art.
Figure 1:
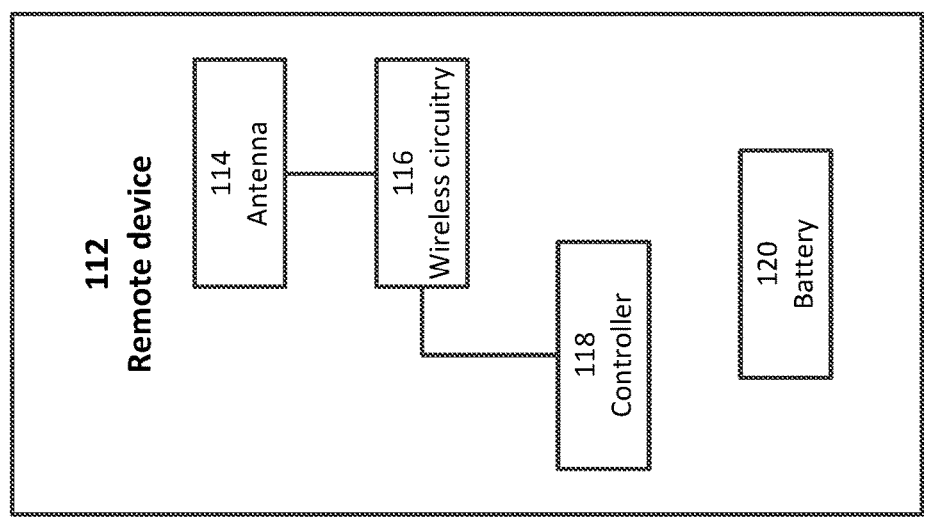

FIG. 1 is a block diagram of one embodiment of a capacitive touch keyless access control system 100 according to the prior art. A reader 102 is located on or near a door or other access point for which access security is desired. Reader 102 contains a capacitive touch sensor 104, wireless communication circuitry 106, an antenna 108 and a controller 110.

An active credential remote device 112 is carried by a user, and as above may be a fob, keycard or other remote device, or may be contained with, and utilize some components of, a mobile communication device such as a smartphone. Remote device 112 contains wireless communication circuitry 116 and antenna 114, as well as a controller 118 containing an authorization code, and is powered by a battery 120. In some instances remote device 112 may also include an input device (not shown), which may, for example, allow an authorization code to be entered into controller 118 or for a previously entered authorization code to be changed. Antenna 114 broadcasts a wireless signal, such as a Bluetooth signal, with the authorization code contained in controller 118.

The reader 102 remains in a standby mode until a user touches the lock and activates the capacitive touch sensor 104. When this occurs, controller 110 performs a scan for a wireless signal from a remote device, such as remote device 112, using wireless communication circuitry 106 and antenna 108; again, this is typically a scan for a Bluetooth signal, and may be a Bluetooth Low Energy (BLE) scan. If controller 110 detects a Bluetooth signal from a remote device 112 that is within range, controller 110 induces a Bluetooth connection with remote device 112, and controller 110 in reader 102 and controller 118 in remote device 112 perform an encrypted handshake that attempts to verify that remote device 112 is authorized to access the lock in question at that time.

If the access attempt is valid (i.e., remote device 112 is authorized to access the lock in question at that time), controller 110 unlocks the door by, for example, activating a motor (not shown) to toggle a deadbolt in the lock (not shown) from a locked state to an unlocked state and then, after the door has been opened and then closed again, or after a predetermined time (in case the door is not opened at all), controller 110 again activates the motor to toggle the deadbolt from the unlocked state back to the locked state.

Figure 2:
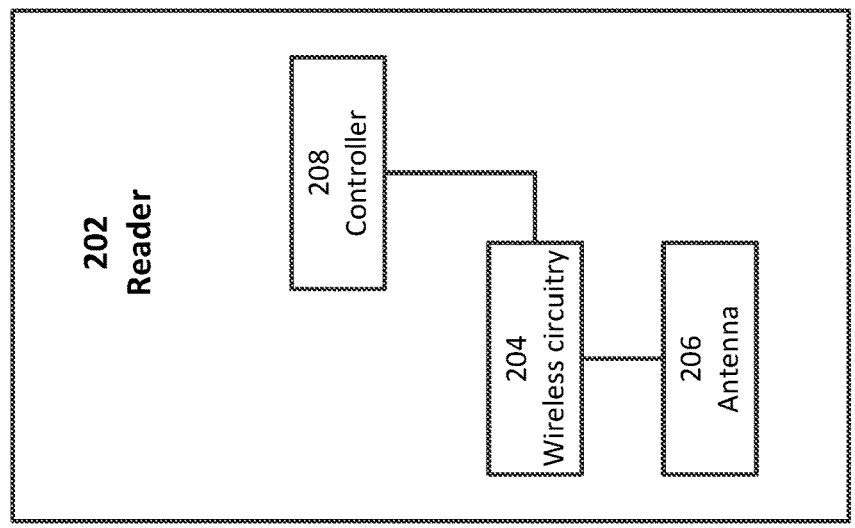
FIG. 2 is a block diagram of an RFID keyless access control system according to the prior art.
Figure 2:
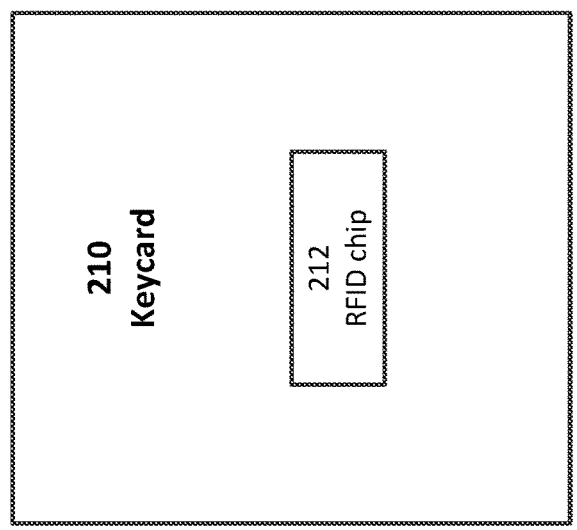

FIG. 2 is a block diagram of one embodiment of an RFID keyless access control system 200 according to the prior art. A reader 202 is located on or near a door or other access point for which access security is desired. Reader 202 contains RFID wireless communication circuitry 204, an antenna 206 and a controller 208. A passive credential remote device 210 containing an RFID chip 212 is carried by a user, and as above may again be a fob, keycard or other remote device.

As has been described, antenna 206 in RFID reader 202 continuously generates an excitation signal that will energize RFID chip 212 in remote device 210 when remote device 210 comes into close proximity to reader 202 and cause RFID chip 212 to transmit its code. If reader 202 receives such a code, it will attempt to verify that the code provides authorization to access the lock in question; alternatively, the logic to determine whether the code provides such authorization may reside in a separate controller located elsewhere to which reader 202 communicates the received code. While capacitive touch systems are typically used in connection with deadbolt locks, keyless locks using RFID are often used with "magnetic strike" doors such as are generally found in commercial buildings. If the reader (or controller) determines that a remote device is authorized to unlock the particular door associated with a reader to which the remote device is presented, the reader may, for example, grant access by de-energizing the door's magnetic strike lock for a predetermined amount of time, perhaps 5 seconds, after which the lock is re-energized so that the door may again be locked.

One of skill in the art will appreciate that it is possible to modify either type of keyless system to work with either type of lock. Thus, while capacitive touch systems are typically used with deadbolt locks and RFID systems with magnetic strike locks, it is relatively straightforward to modify a capacitive touch system to work with magnetic strike locks or an RFID system to work with deadbolt locks.

As above, it has been thought impossible to combine a capacitive touch system with an RFID system since the excitation signal of the RFID system energizes the capacitive touch sensor and interferes with detection of the touch of a user. This problem may be avoided in a combined system of the present approach by selectively turning the RFID antenna on (i.e., energizing it) and off (i.e., not energizing it) at periodic time intervals, as will now be described.

Thus, in one embodiment a keyless access system utilizes a combination reader containing both a capacitive touch sensor that responds to a user's touch, and an RFID reader having an antenna that can activate an RFID chip in close proximity. Both of these elements function as described above, with the exception that the RFID antenna no longer transmits an excitation signal continuously.

The capacitive touch sensor is kept on and active at all times, while the RFID antenna is toggled on and off at periodic time intervals. The time interval period is selected to be long enough so that if the user presents a remote device during the time the RFID antenna is on, the inductive energy received by the RFID chip is enough to cause the RFID chip to transmit its code to the RFID reader, as well as long enough to allow a user to touch the capacitive touch sensor and the change in capacitance to be measured during the time the RFID antenna is off. It has been found that a time interval period of 150 milliseconds (ms) is long enough for both of these effects to occur.

It will be seen from this, and the discussion above, that when the RFID antenna is on, the capacitive touch sensor will typically not properly respond to a user's touch. (Alternatively, the capacitive touch sensor may be ignored or even turned off when the RFID antenna is on.) While this may appear on the surface to be a negative effect, as a practical matter it is not significant. The normal reaction time of a person, i.e., a user, is on the average of about 250 ms; since the RFID antenna is turned on for 150 ms, then off for 150 ms, and then on again, a user is very unlikely to perceive any delay, since even in the worst case scenario by the time the user can react the RFID antenna will be off again and the capacitive touch sensor will again be responsive to the user's touch.

Figure 3:
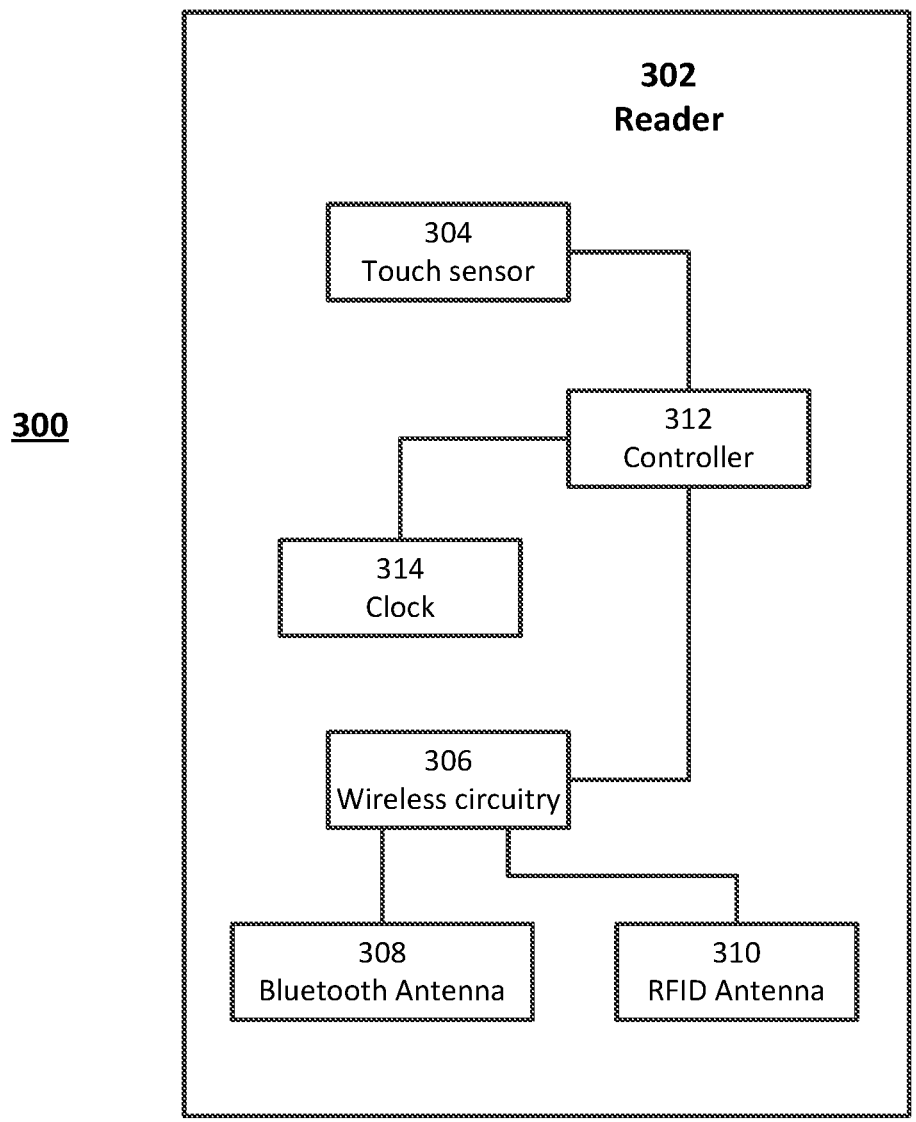
FIG. 3 is a block diagram of a keyless access control system combining a capacitive touch keyless access control system and an RFID keyless access control system according to one embodiment.

FIG. 3 is a block diagram of a keyless access control system 300 combining a capacitive touch keyless access control system and an RFID keyless access control system according to one embodiment. Like the prior art capacitive touch and RFID readers of FIGS. 1 and 2 respectively, combination reader 302 contains wireless communications circuitry 306 and controller 312, and a capacitive touch sensor 304, as in prior art capacitive touch system 100 of FIG. 1. Combination reader 302 also contains a Bluetooth antenna 308, an RFID antenna 310, and a clock or oscillator 312.

While capacitive touch sensor 304 of combination reader 302 functions in the same way as capacitive touch sensor 104 of reader 102 in FIG. 1, other components of combination reader 302 operate slightly differently than those of the prior art readers.

Wireless circuitry 306 is capable of working with both Bluetooth antenna 308 and RFID antenna 310. Wireless circuitry 306 and Bluetooth antenna 308 are capable of detecting a Bluetooth signal from a remote active credential (not shown), as are wireless circuitry 106 and antenna 208 in FIG. 1. Wireless circuitry 306 and RFID antenna 310 are capable of broadcasting an RFID signal that can energize a nearby RFID chip and then receiving the return signal from that RFID chip, in a similar fashion to wireless circuitry 106 and antenna 108 of FIG. 1.

Controller 312, either by itself or by communicating with a physically separate controller (not shown), is capable of determining whether either a received Bluetooth signal or a received RFID signal contains an appropriate authorization code for the door to which the combination reader 302 corresponds, and, if so, sending an appropriate command to open the lock that secures the door.

As above, a continuous RFID signal will also energize the capacitive touch sensor 304 and render it incapable of properly detecting a touch by a user. Also as above, one solution is to toggle the RFID antenna on and off at regular time intervals. Thus, combination reader 302 also contains clock 314 to provide timing of the time intervals.

Using clock 312 to measure the time intervals, controller 312 causes RFID antenna 310 to toggle on and off, i.e., to transmit an RFID signal for a time, and then stop transmitting an RFID signal for a time. As above, in one embodiment, the time for each interval is 150 ms. This thus provides a time interval or period of 150 ms during which capacitive touch sensor 304 can operate properly and respond to a user's touch for 150 ms and RFID antenna 310 is incapable of receiving an RFID signal, followed by a time interval or period of 150 ms during which the conditions are reversed, so that the capacitive touch sensor 304 will not respond properly to a user's touch but RFID antenna 310 will receive an RFID signal from a nearby RFID chip.

Using this solution, the user is able to approach a combination reader on the outside of the secure door, and either touch the reader (or in some cases as described above, wave a hand near it) or present an RFID credential to the reader. If the user touches the reader the capacitive touch sensor is activated causing the controller to look for a Bluetooth signal containing an authorization code, while if the user presents an RFID credential the energy received from the RFID antenna will cause the RFID chip in the credential to transmit its authorization code.

Although either one of these responses may be delayed by as much as 150 ms, as above the user is unlikely to notice since normal reaction times are greater than 150 ms, and thus the user will most likely perceive the system to be operating just as either a capacitive touch sensor system or an RFID system operate in the prior art.

Figure 4:
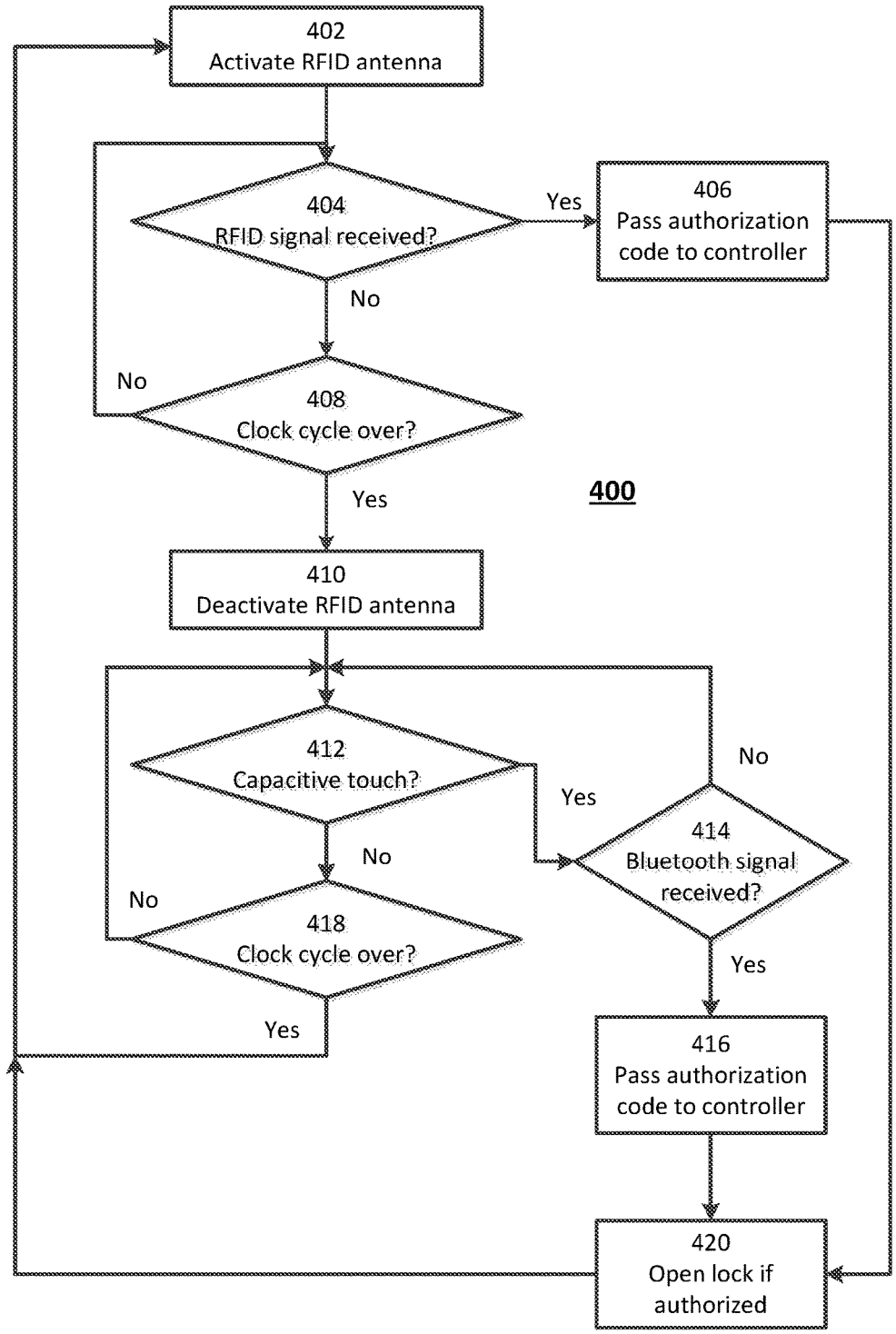
FIG. 4 is a flowchart of a method of using a keyless access control system combining a capacitive touch keyless access control system and an RFID keyless access control system according to one embodiment.

FIG. 4 is a flowchart of a method 400 of using a keyless access control system according to one embodiment, using a system such as that described herein. At step 402 the RFID antenna, such as RFID antenna 310, is activated. At step 404, wireless circuitry, such as wireless circuitry 306, determines whether an RFID signal has been received, and, if an RFID signal has been received, at step 406 passes the authorization code contained in the RFID signal to a controller, such as controller 312. If the controller determines that the user is authorized, at step 420 the controller issues an appropriate instruction to lock components to open the lock.

If no RFID signal has been received, at step 408 the controller determines whether the clock cycle is over, for example using input from a clock such as clock 314 indicating elapse of the periodic time interval. If the controller determines that the clock cycle is not over, the process returns to step 404 and the search for an RFID signal continues. If the clock cycle is over, at step 410 the RFID antenna is deactivated (turned off), so that, as described above, the capacitive touch sensor, such as sensor 304, is operable.

Once the capacitive touch sensor is operable, at step 412 the sensor, for example touch sensor 304, (or a controller) determines whether there has been a capacitive touch. If a capacitive touch has been received, at step 414 the wireless circuitry (or a controller) determines whether a Bluetooth signal has been received. If a Bluetooth signal has been received, at step 416 the authorization code contained in the signal is passed to the controller to determine if the user is authorized to access the location, and, if so, at step 420 the controller again issues an appropriate instruction to lock components to open the lock.

If no capacitive touch has been received, at step 418 the controller again determines whether the current clock cycle is over. If the controller determines that the clock cycle is not over, the process returns to step 412 to continue to monitor for a capacitive touch. If the clock cycle is over, the process returns to step 402 to once again activate the RFID antenna.

As in the prior art, the opening of a lock will depend upon the type of lock used and may be accomplished by, for example, retracting a deadbolt in the case of deadbolt locks, or demagnetizing a strike plate in the case of magnetic strike doors.

In this way, again with an appropriate clock cycle time interval as described above, a user will be able to access a keyless access control system with either an active credential, such as a Bluetooth device, or a passive credential, such as a keycard or other remote device with an RFID chip, with the system appearing to function as either prior art system without any delay being apparent.

One of skill in the art will appreciate that some of the steps described may be considered to be simultaneous, rather than be sequential, and that the order of some steps may be altered without affecting the outcome of the described process or operation of the related system.

The disclosed method and apparatus has been explained above with reference to several embodiments. Other embodiments will be apparent to those skilled in the art in light of this disclosure. Certain aspects of the described method and apparatus may readily be implemented using configurations or process steps other than those described in the embodiments above, or in conjunction with elements other than those described above. For example, different types of controllers, processors and/or logic circuits, perhaps more complex than those described herein, may be used, and in some embodiments the required logic may be hard wired or embodied in software. In still other embodiments, different algorithms, again perhaps more complex than those described herein, may be used.

As noted herein, assorted variations are possible. The clock may be an integral part of the controller. Different communications protocols other than Bluetooth may be used. For example, other short range wireless communications protocols such as near field communications (NFC) or wireless local-area network (WLAN) protocols may be used. In some instances, it may even be appropriate to use a long range communications protocol, such as a cellular or global positioning system (GPS) protocol. Those of skill in the art will be able to determine whether other time periods for cycling the energizing of the RFID antenna are desirable or appropriate.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or via a computer network wherein the program instructions are sent over optical or electronic communication links. Such program instructions may be executed by means of a processor or controller, or may be incorporated into fixed logic elements. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A keyless access control device for controlling access to an area protected by a lock, comprising:
   an RFID antenna configured to generate an excitation signal and receive a return signal from a nearby RFID chip;
   a wireless antenna;
   a capacitive touch sensor configured to determine when a user has touched the capacitive touch sensor;
   a wireless communications circuit configured to:
      use the wireless antenna to seek an active wireless signal from a nearby active wireless device when the capacitive touch sensor has been touched; and
      determine whether a received return RFID signal or a received wireless signal contains an authorization code; and
   a controller configured to:
      cause the wireless communications circuit to turn the RFID antenna on and off at regular time intervals, the capacitive touch sensor remaining active while the RFID antenna is off; and
      determine whether a received authorization code permits access to the protected area, and, if so, unlock the lock.

2. The keyless access control device of claim 1 wherein the wireless antenna is a Bluetooth antenna and the nearby active wireless device is a Bluetooth device.

3. The keyless access control device of claim 1 wherein the wireless antenna is a near field communication antenna and the nearby active wireless device is a near field communication device.

4. The keyless access control device of claim 1 wherein the wireless antenna is a wireless local-area network antenna and the nearby active wireless device is a wireless local-area network device.

5. The keyless access control device of claim 1 further comprising a clock configured to time the regular time intervals.

6. The keyless access control device of claim 1 wherein the regular time intervals are less than one-quarter of a second.

7. A method of providing keyless access control to an area protected by a lock, comprising:
   generating, from an RFID antenna, an excitation signal at regular time intervals;
   determining, by a wireless communication circuit, when the RFID antenna is generating an excitation signal, whether a return RFID signal has been received from a nearby RFID chip and whether the return RFID signal contains an authorization code;
   determining, by the wireless communication circuit, when the RFID antenna is not generating an excitation signal:
      whether a user has touched a capacitive touch sensor, the capacitive touch sensor remaining active during the intervals in which the RFID antenna does not generate an excitation signal;
      if a user has touched the capacitive touch sensor, whether an active wireless signal has been received from a nearby active wireless device; and
      if an active wireless signal has been received, whether the active wireless signal contains an authorization code; and determining, by a controller, whether a received authorization code permits access to the protected area, and, if the received authorization code permits access, unlocking the lock.

8. The method of claim 7 wherein the active wireless signal is a Bluetooth signal and the nearby active wireless device is a Bluetooth device.

9. The method of claim 7 wherein the active wireless signal is a near field communication signal and the nearby active wireless device is a near field communication device.

10. The method of claim 7 wherein the active wireless signal is a wireless local-area network signal and the nearby active wireless device is a wireless local-area network device.

11. The method of claim 7 further comprising generating regular time intervals by a clock.

12. The method of claim 7 wherein the regular time intervals are less than one-quarter of a second.

* * * * *